(12) United States Patent
Koren

(10) Patent No.: US 7,549,616 B1
(45) Date of Patent: Jun. 23, 2009

(54) MOLDING DEVICE FOR MOLDING PARTS

(75) Inventor: Robert Douglas Koren, Cary, NC (US)

(73) Assignee: Column & Post, Incorporated, Garner, NC (US)

( * ) Notice: Subject to any disclaimer, the term of this patent is extended or adjusted under 35 U.S.C. 154(b) by 798 days.

(21) Appl. No.: 11/018,127

(22) Filed: Dec. 21, 2004

(51) Int. Cl.
*B29C 39/36* (2006.01)

(52) U.S. Cl. .................. 249/63; 249/127; 249/142; 249/178; 249/183; 425/440

(58) Field of Classification Search .............. 249/48, 249/51, 57, 63, 65, 127, 142–143, 183, 163, 249/168, 178; 425/63, 438, 440, DIG. 44, 425/DIG. 112
See application file for complete search history.

(56) References Cited

U.S. PATENT DOCUMENTS 3,741,707 A * 6/1973 Baumann et al. ............ 425/435
5,755,982 A * 5/1998 Strickland et al. ........... 249/168
5,858,294 A 1/1999 Del Valle et al.
6,491,856 B1 12/2002 Noirot
6,808,154 B2 10/2004 Koren \* cited by examiner

*Primary Examiner*—Yogendra Gupta
*Assistant Examiner*—Thu Khanh T Nguyen
(74) *Attorney, Agent, or Firm*—Coats & Bennett, P.L.L.C.

(57) ABSTRACT

A molding device is provided that includes outer and inner rubber molds that define a space therebetween for forming a column. Inserted within the inner mold is an elongated rigid member. A multisectional housing surrounds the outer mold and includes a plurality of sections that in a molding mode are secured together by fasteners. Once the column has been molded between the outer and inner molds, the fasteners are released allowing the sections of the housing to be relaxed or removed from around the outer mold. This permits the outer mold to expand or move slightly outwardly and in response to that outward movement, the pressure or force on the molded column lying between the outer and inner molds is reduced. This facilitates the extraction of the column from between the outer and inner molds.

16 Claims, 4 Drawing Sheets

MOLDING DEVICE FOR MOLDING PARTS

FIELD OF INVENTION

The present invention relates to molds, and more particularly, to molding devices that are utilized to form elongated hollow parts such as columns.

BACKGROUND OF THE INVENTION

Column structures are widely used in residential and commercial buildings. They are used in exterior and interior applications and in load bearing and non-load bearing situations. The outer surface may include various forms of ornamentation and designs. Until recently, most columns used in residential construction were made from wood. But wooden columns have drawbacks. They are expensive and providing wooden columns with interesting and appealing designs makes them even more expensive.

In recent years contractors and homeowners have moved away from wooden columns in favor of molded columns. Molded columns offer numerous advantages over wooden columns such as lower costs, a variety of designs, and structural strength.

Various types of molding processes are known for making columns used in the building industry. One process is shown in U.S. Pat. No. 6,808,154, the disclosure of which is expressly incorporated herein by reference. This process utilizes a molding device having elongated inner and outer rubber molds. An elongated rigid member is extended through the inner mold. A housing is secured around the outer mold. The inner and outer rubber molds are spaced apart, and in the molding process viscous material that ultimately forms the molded part is poured downwardly between the inner and outer molds and allowed to harden and cure. After this the molded column is extracted. To remove the column, the rigid core is removed. Next, the inner mold is removed by first withdrawing the inner mold from close engagement with the column through a vacuum process and then simply pulling the inner mold from the molding device. Removing the molded column is still difficult because the outer rubber mold remains hot, or at least warm, and tends to expand between the column and the interior of the housing. This expansion tends to pinch the column, making it difficult to remove the column from the molding device, especially without damaging the outer mold or causing excessive wear on the outer mold. Indeed, this pinching effect has a detrimental effect on the life of the outer mold. Further, in cases where the outer mold forms flutes, indentions and other intricate designs in the face of the column, it is necessary to completely remove the housing, or at least portions of the housing, from the outer mold. This pinching effect, alluded to above, makes it difficult to remove the housing from the outer mold.

In the past, some of the pinching has been removed by providing the housing structure in the form of a double C-shaped housing, and decoupling or disconnecting the two C-sections prior to removing the molded column. However, in the case of a square or rectangular molding device, this only relieves the pinching on two opposed sides of the outer mold. On the other two sides, the outer mold still tends to expand outwardly and press against the interior of the adjacent housing, and this, in turn, causes the molded column to be tightly held between at least two sides of the outer mold.

Therefore, there is a need for a molding device for molding columns that will substantially eliminate this pinching effect and permit the molded column to be removed from the molding device without damaging or causing undue wear to the outer mold.

SUMMARY OF THE INVENTION

The present invention provides a molding device having inner and outer molds, and a multisectional housing that, during a molding process, extends around the outer mold. After a part or column has been formed between the inner and outer molds, the multisectional housing is decoupled or disconnected such that the outer mold is permitted to expand outwardly around a substantial portion of the outer mold.

In the case of one embodiment, the outer mold assumes a rectangular or square configuration. The multisectional outer housing when decoupled or disconnected, permits at least a majority, of the sides of the outer mold to expand outwardly. This relieves pinching pressure on the internal molded part and facilitates the extraction of the molded part from the mold.

In another embodiment of the present invention, a molding device is provided for molding a part. The molding device includes a flexible outer mold, a flexible inner mold, and a space defined between the outer and inner molds for holding material to form the part. A rigid core is disposed interiorly of the inner mold. A multisectional housing extends around the outer mold and includes two separable L-shaped sections that during a molding process, extend at least partially around the outer mold. A series of fasteners is provided for securing the sections of the mold together.

Additionally, the present invention entails a method of extracting a part or column from a molding device. More particularly, the method entails extracting a molded part or column from between outer and inner rubber molds held within a molding device having a multisectional housing that extends around the outer mold and where the outer mold includes at least four sides. The method entails molding the part or column between the inner and outer molds. Thereafter, the method includes decoupling the multisectional housing such that the outer mold is free to expand outwardly about at least three sides. This tends to relieve pinching pressure being applied against the internal molded part or column, and facilitates the extraction of the molded part or column from the outer mold.

Other objects and advantages of the present invention will become apparent and obvious from a study of the following description and the accompanying drawings, which are merely illustrative of such invention.

DESCRIPTION OF AN EXEMPLARY EMBODIMENT

Figure 1:
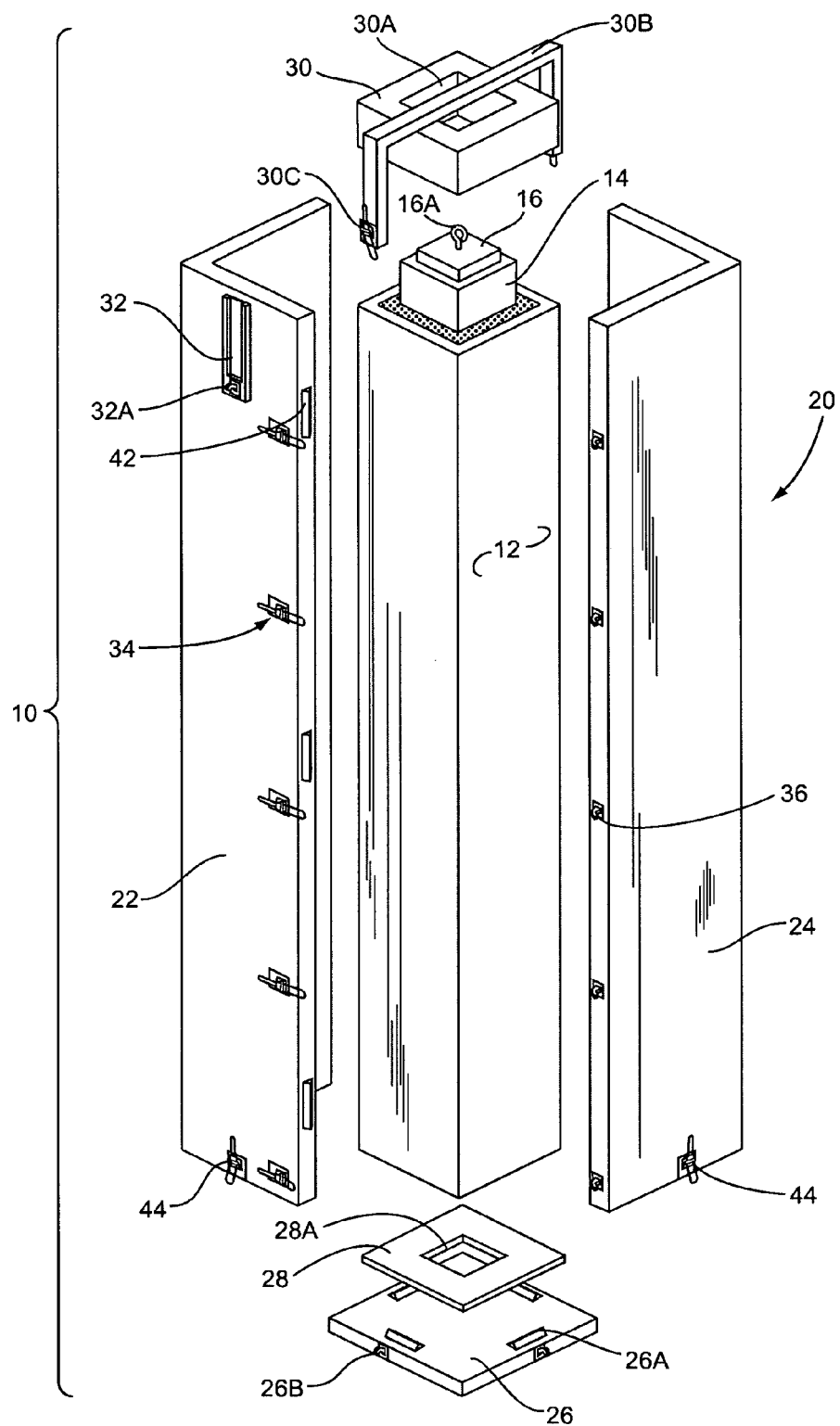
FIG. 1 is a perspective exploded view showing the components of the molding device of the present invention.

With further reference to the drawings, the molding device of the present invention is shown therein and indicated generally by the numeral 10. Molding device 10 is designed to mold parts such as columns that are used in building structures, especially residential housing. Molding device 10 comprises an elongated inner rubber mold 14 and an elongated outer rubber mold 12. Molds 12 and 14 are spaced apart and define a molding cavity therebetween. As will be appreciated from subsequent portions of the disclosure, molding material is poured between the outer and inner molds 12 and 14 and through a molding process is permitted to harden to form a part such as a column 18. Outer mold 14 about one end is particularly configured to lock into the housing of the molding device and to reduce the size of the terminal end of the part or column 18 being formed. Note in FIG. 5 where the outer mold 12 includes an outer end flange 12A that projects into a cavity or indention 60 that is formed in the housing and particularly the L-shaped sections 22 and 24 to be subsequently described. As viewed in FIG. 5, this arrangement permits the outer mold 12 from moving left to right. Further, about the same end of the outer mold 12 there is provided an inner flange 12B. Inner flange 12B effectively reduces the cross sectional area of the terminal end of the part or column 18.

Figure 5:
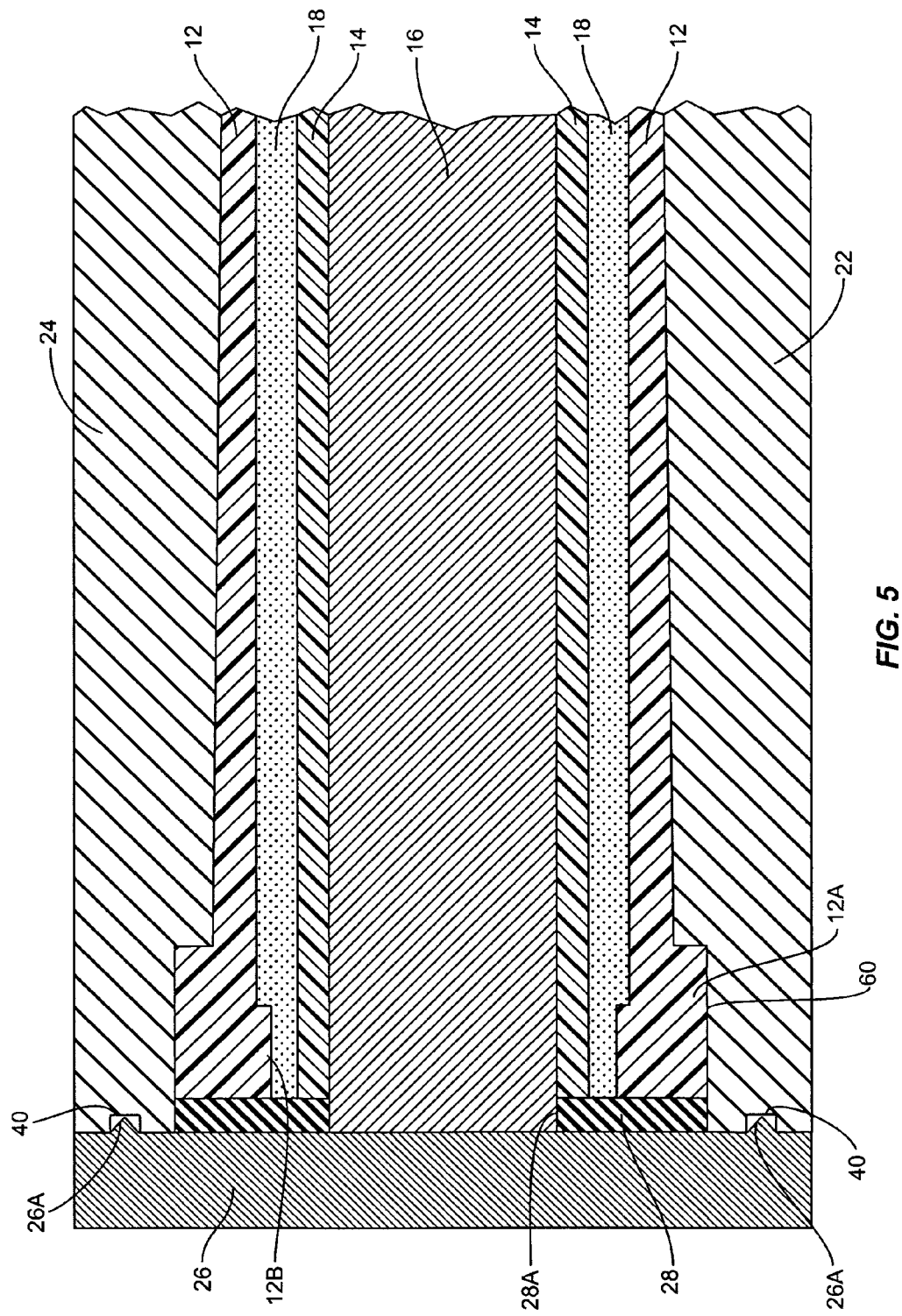
FIG. 5 is an elongated fragmentary perspective view of one portion of the molding device.

Molding device 10 further includes a rigid core 16. Core 16 is designed to be inserted within the inner mold 14. When inserted within inner mold 14, core 16 supports the inner mold 14 and generally maintains the rubber inner mold 14 in a stable shape. Rigid core 16 includes a pair of end portions. One end portion, as viewed in FIG. 5, is flat while the other end portion includes an eyelet 16A. Once a part has been molded in the molding device, it is necessary to remove the rigid core 16. Eyelet 16A can be connected to a cable that extends from an electric wench. Hence, eyelet 16A facilitates the removal of the rigid core 16.

Also forming a part of the molding device 10 is a multi-sectional housing indicated generally by the numeral 20. Housing 20 includes at least two sections that are securable together to form an outer housing structure that surrounds and confines the outer mold 12. In the embodiment illustrated in the drawings, housing 20 includes a pair of L-shaped sections 22 and 24. See FIG. 1. Each L-shaped section includes a pair of sides that are joined together to form an angle of approximately 90°. When the two L-sections 22 and 24 are secured together and extend around the outer mold 12, it is seen that they form a generally square or rectangular housing when viewed in cross section. Housing 20 can be constructed of various materials such as wood, plastic, metal and other suitable materials.

In addition to the L-shaped sections 22 and 24, the multi-sectional housing 20 includes an end plate 26 that secures to one end of the housing 20 and generally encloses that portion of the molding device 10. As illustrated in FIG. 1, end plate 26 includes a series of keys 26A secured to the inner face thereof and which project therefrom. Keys 26A are designed to be inserted within openings 40 formed in the edges of one end of the respective sections 22 and 24. In FIG. 5, it is noted that the triangular shaped keys 26A project into the openings 40 formed in the L-shaped sections 22 and 24. This aligns the end plate 26 with the end edges of the L-shaped sections 22 and 24 as shown in FIG. 5.

End plate 26 is connected to the L-shaped sections through a series of fasteners. Forming a part of each fastener is a hook 26B that is secured to respective edges of the end plate 26. Further, secured to each respective side of each section 22 and 24 about one end portion is a connector 44 that is designed to engage and couple to one of the hooks 26B formed on the end plate 26.

Disposed just interiorly of the end plate 26 is an indexer or centering plate 28. Centering plate 28 includes a central opening 28A. When incorporated into the molding device, the centering plate 28 lies directly adjacent the inner face of the end plate 26 as shown in FIG. 5. Note that the edges of the centering plate 28 abuts with the L-shaped sections 22 and 24, and that the rigid core 16 projects through the opening 28A to abut against the inner face of the end plate 26. The ends of the outer and inner molds 12 and 14 abut against the inner face of the centering plate 28. The centering plate 28 effectively centers the outer and inner molds 12 and 14 between the rigid core 16 and the sections of the housing 22 and 24.

Provided about the opposite end of the molding device 10 is an end cap indicated generally by the numeral 30. See FIGS. 1 and 2. End cap 30 includes an opening 30A and a generally U-shaped yolk 30B. Opening 30$a$ is particularly configured to fit around and end portion of the inner mold 14. As seen in FIG. 1 when the end cap 30 is secured to the end of the housing 20, opening 30A fits around the inner mold 14 and centers and aligns the inner mold 14 with housing 20. Formed or provided on the terminal ends of the yolk 30B is a connector 30C.

A track 32 is mounted to an end portion of each L-shaped section 22 and 24. In particular, track 32 is mounted to an end portion of the sections 22 and 24 opposite the end plate 26. Provided with each track 32 is a connector or hook 32A. The connectors 30C and 32A cooperate to connect the end cap 30 about an end portion of the housing 20. Note that portions of the yolk 30B are adapted to be inserted into the respective tracks 32 and the end cap 30 can be pressed down to where the connector 30C of the yolk 30B is connected or coupled with the connector or hook 32A associated with the track 32. Normally in the molding process, the molding device 10 is vertically oriented as shown in FIG. 1. However, the end cap 30 is not secured to the housing 20 initially. Rather, the viscous material is poured into the molding cavity defined between the outer and inner molds 12 and 14. After a selected time period, the end cap 30 is then secured to the housing 20, which serves to further align the L-shaped sections 22 and 24 with the inner mold 14.

Figure 2:
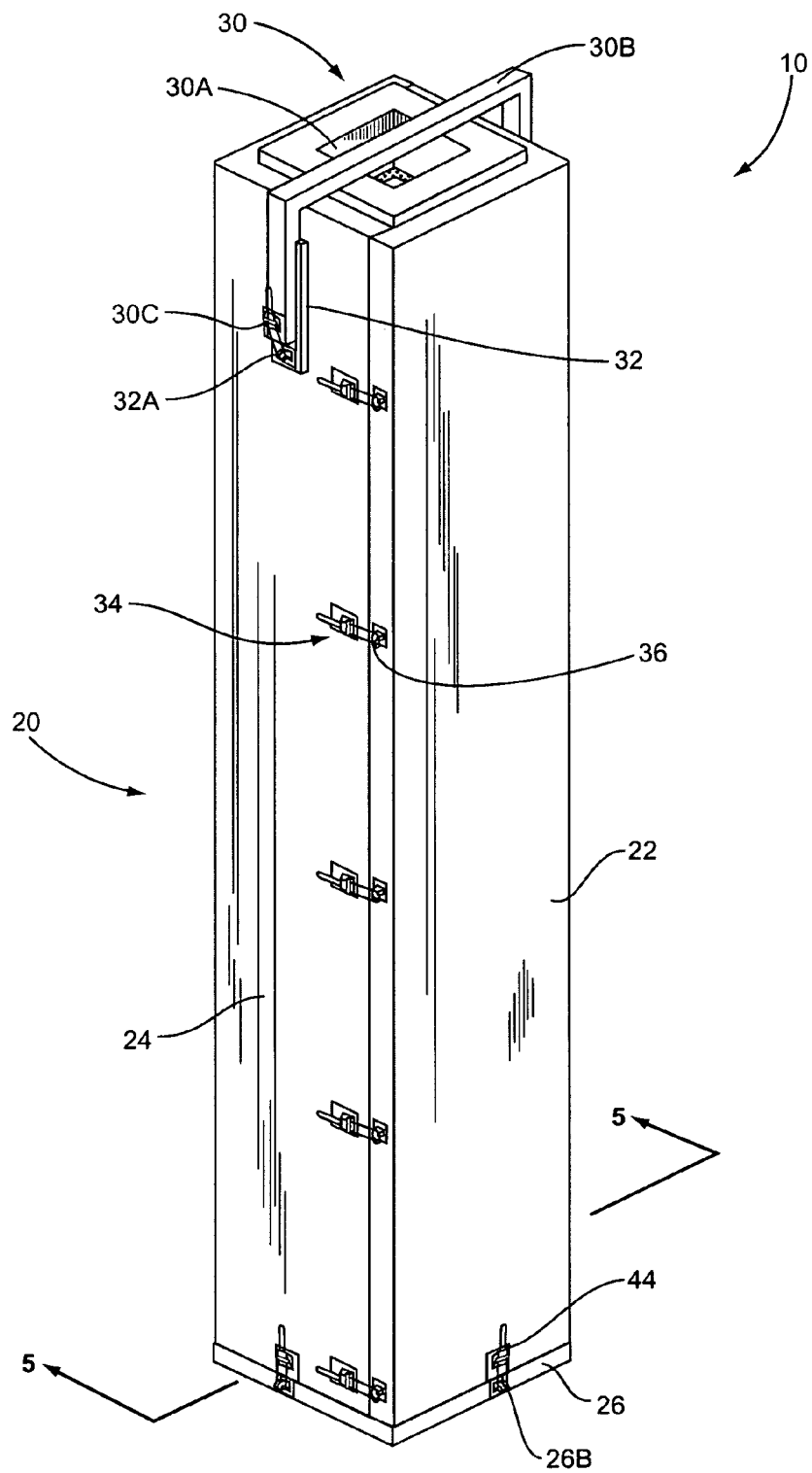
FIG. 2 is a perspective view of the molding device shown standing in a vertical position.
Figure 3:
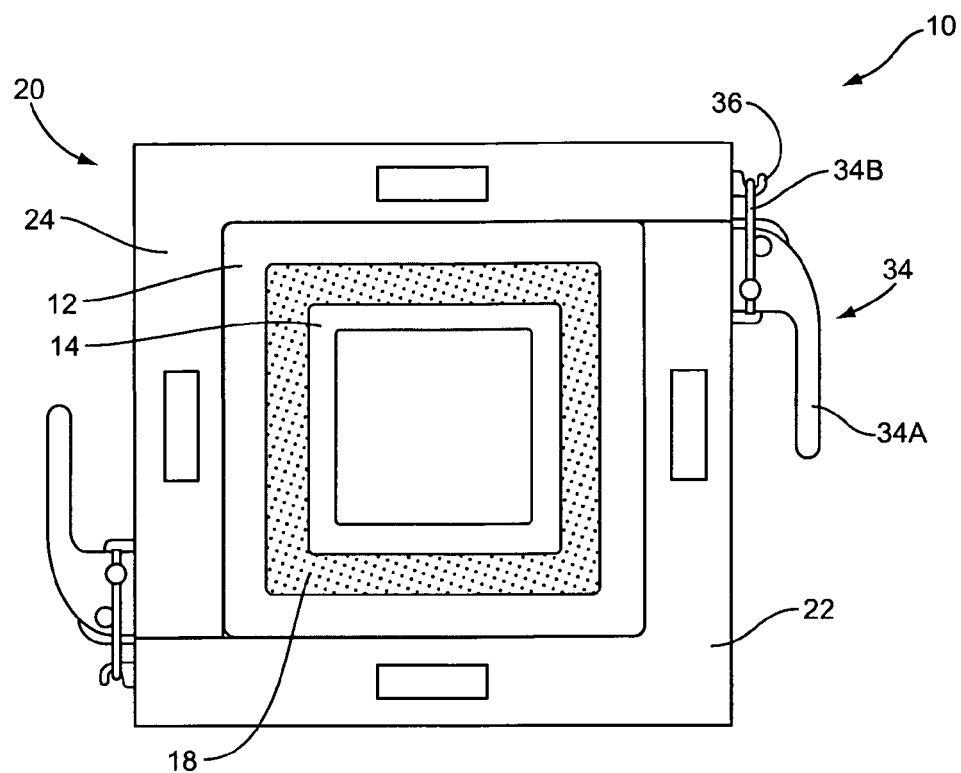
FIG. 3 is a transverse cross sectional view of the molding device showing the multisectional housing in the fastened or closed position.

To secure the respective sections 22 and 24 of the housing 20 together, there is provided two sets of fasteners. Each set of fasteners is operative to connect one edge of one section to the edge of another section. FIG. 1 illustrates one set of fasteners. Each fastener includes an over-center latch 34. Over-center latch 34 includes a pivoting handle 34A and a yolk 34B that extends from the handle 34A. As illustrated in FIGS. 1-4, the over-center latches 34 are secured along one edge of one section in spaced apart relationship. Aligned therewith, on the adjoining section, is a series of hooks 36. Thus, when the sections 22 and 24 are coupled together, the over-center latches 34 are operative to cause the yolks 34B thereof to engage the adjacent hooks 36. When the over-center latches 34 are pivoted to its downward position as shown in FIG. 3, it is appreciated that the yolks 34B cause the two sections 22 and 24 to be secured together along the line of fasteners formed by the over-center latches 34 and the hooks 36.

Housing 20 assumes two different modes. In one mode, the L-shaped sections 22 and 24 are secured and fastened together and the end plate 26 as well as the end cap 30 (after the initial pour) is secured about opposite ends of the molding device. In this mode, the molding device assumes a processing or molding mode. In a second mode, the respective components of the housing 20, particularly the L-shaped sections 22 and 24, are decoupled or disconnected. In this mode, sometimes referred to as an extraction mode, the formed part, which in this case is a column, is removed from the molding device.

In the molding mode, the molding device is stood up on end such that it assumes a vertical orientation. This is illustrated in FIGS. 1 and 2. In this particular case, the portion of the molding device that includes the end plate 26 forms the lower end of the molding device. As noted above, in a processing or molding mode, the respective components of the housing 20 are all secured together except the end cap 30. The molding material is then poured into the molding cavity defined between the outer and inner molds 12 and 14. A variety of molding materials can be used for forming the part, or in this case, the column. The molding material initially assumes a viscous state having a consistency that allows the material to be poured into the cavity defined between the outer and inner molds 12 and 14. At a selected time, the end cap 30 is secured to the top of the molding device 10. The molding material goes through a gelled stage in which it begins to harden before finally achieving a cured state in which it is hardened. The molding material generally shrinks as it progresses through the gelled and cured states. Because of this shrinking action it may be appropriate at certain times to remove the inner mold 14 to assure that the inner mold does not get entrapped or bound with the shrinking material that forms a part of the column.

When initially poured into the mold, the molding material may trap air and potentially cause defects in the column if the air is not removed. To facilitate the removal of air pockets, a vibrator, such as a pneumatic vibrator, can be attached to the housing 20 to vibrate the material and remove the air.

After the molding material has reached a gelled state and possesses sufficient stability to bear against the inner surface of the outer mold 12, the core 16 is removed from the molding device. Before removing the core 16, the sections 22 and 24 of the housing are detached from one another such that the housing assumes a decoupled or extraction mode. In this process, the end cap 30 and the end plate 26 are removed. Further, the section fasteners are unlatched and in the process the two L-shaped sections 22 and 24 are detached from one another. Now the housing assumes an extraction mode.

Figure 4:
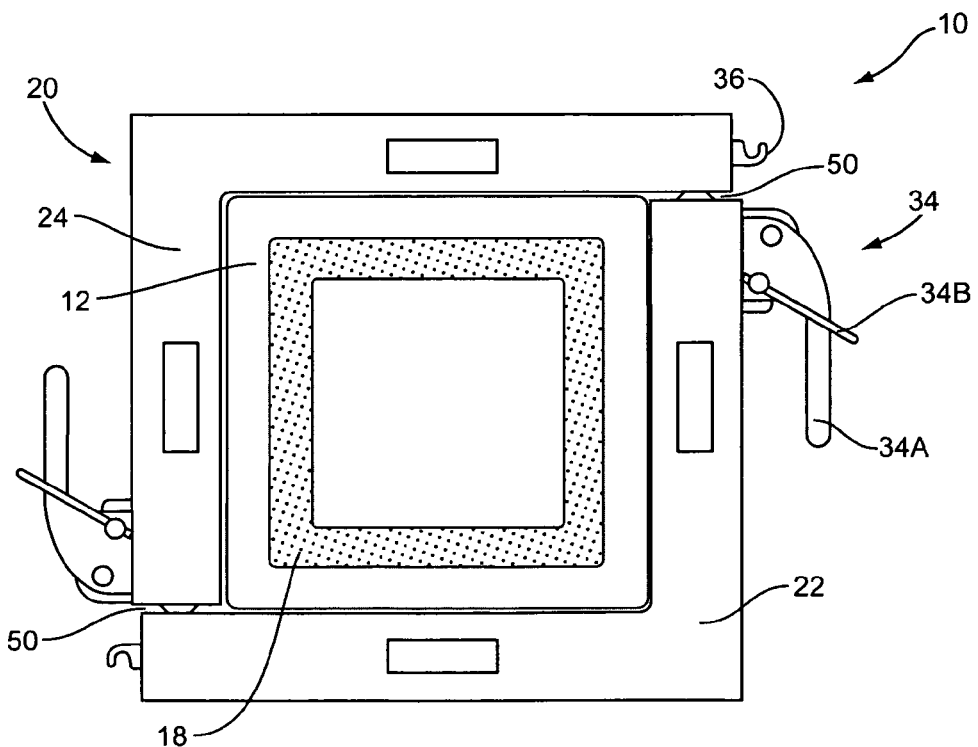
FIG. 4 is a cross sectional view similar to FIG. 3, but with the multisectional housing being shown decoupled or disconnected.

Sections 22 and 24 of the housing can be completely removed from the outer mold 12, or in the alternative, can simply be allowed to assume a relaxed configuration with respect to the outer mold 12 as illustrated in FIG. 4. However, in any event, it may be preferable to rotate the molding device to a horizontal position. In this case, the rigid core 16 can be pulled from the inner mold 14 in conventional fashion. Once the inner core 16 has been pulled from the inner mold 14, then a vacuum extractor can be inserted into the opening formerly occupied by the rigid core 16. The actuation of the vacuum extractor will effectively suck the inner mold 14 inwardly around the extractor, separating the inner mold from the formed part or column 18. Once the inner mold has been pulled away from the inner surface of the formed part of column 18, the extractor having the inner mold 14 adhered thereto can be pulled from the molded part or column.

Once the inner mold 14 has been removed from the part or column 18, then the part or column 18 can be removed from the outer mold 12. FIG. 4 illustrates a cross section of the mold device after the inner mold 14 has been removed. Note that the fasteners that connect the L-shaped sections 22 and 24 together are in an unsecured state. This permits the L-shaped sections 22 and 24 to assume a relaxed position around the outer mold. Note that once the fasteners are unfastened, that there is created small spaces between the inner faces where the L-shaped sections 22 and 24 meet. These are sometimes referred to as break lines 50. These break lines permit the outer mold 12 to expand outwardly about all four of its sides. In the process of expansion, pinching pressure on the outer face of the part or column 18 is substantially reduced. This enables the part or column 18 to be removed from the mold device 10 without scarring or scratching the outer face of the part or column 18 and without damaging and unduly wearing the inner surface of the outer mold 12. In the case of the embodiment illustrated herein, the break lines 50 are formed in opposed corner areas of the mold device. These break lines permit all four sides of the outer mold 12 to expand outwardly.

In some cases, the formed part or column will be molded such that it includes flutes, indentions and other intricate designs. In these cases, it will be desirable to completely remove the sections 22 and 24 of the housing 20 in order to easily remove the outer mold 12 from the formed part or column 18. By providing break lines 50 as illustrated in FIG. 4, the sections 22 and 24 of the housing 20 can be easily and conveniently removed.

From the foregoing discussion, it is seen that by providing a multisectional housing 20 and by selectively providing break lines 50 in the housing when the housing assumes a decoupled mode, the pinching problem normally associated with molds of this type is avoided. That is, by strategically breaking the housing 20, substantially all portions or substantially all sides of the outer mold is permitted to move or expand outwardly in such a fashion that the pressure being exerted by the outer mold 12 against both the part or column 18 as well as the inner face of the housing, makes it difficult to remove or extract the part or column 18.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A molding device for molding a part comprising:
   a flexible outer mold;
   a flexible inner mold;
   a space defined between the outer and inner molds for holding material that form the part;
   a rigid core disposed interiorly of the inner mold;
   a removable multisectional housing for enclosing the outer mold, inner mold and core, the housing including two separable, generally L-shaped sections that join together at corners of the outer mold and that during a molding operation extend at least partially around the outer mold; and
   fasteners for securing the sections of the housing together.

2. The molding device of claim 1 wherein the housing assumes a molding mode and a part extraction mode, and in the molding mode the L-shaped sections extend around and confine the outer mold and in the extraction mode the L-shaped sections may assume relaxed positions with respect to the outer mold that facilitate the removal of the molded part.

3. The molding device of claim 2 wherein in the extraction mode there are at least two breaks in the multisectional housing.

4. The molding device of claim 3 wherein the two breaks lie in opposed corner areas of the housing.

5. The molding device of claim 4 wherein the housing includes a surrounding wall structure and the L-shaped sections form substantially the entirety of the surrounding wall structure.

6. The molding device of claim 1 wherein the outer mold includes a flange portion that fits into an indented portion of the housing.

7. The molding device of claim 6 wherein the flange portion is formed about one end portion of the outer mold.

8. The molding device of claim 1 wherein the fasteners are secured to the L-shaped sections and are operative to secure the two L-shaped sections together.

9. The molding device of claim 8 wherein when the fasteners secure the two L-shaped sections together, the two L-shaped sections form an elongated housing that includes a generally square or rectangular cross section.

10. The molding device of claim 1 wherein the housing includes two ends, and wherein there is provided a plate that is disposed adjacent one end and includes an opening that receives a portion of the core.

11. The molding device of claim 10 wherein the ends of the outer and inner mold abut against the plate.

12. The molding device of claim 10 wherein the opening within the plate is sized and shaped to conform with the size and shape of the core and wherein the plate functions to generally center at least a portion of the core.

13. A molding device for molding parts, comprising:
a rubber inner mold;
a rubber outer mold;
a space defined between the inner and outer molds for forming the parts;
a rigid core adapted to be inserted within the inner mold; and
a removable multisectional housing surrounding the outer mold and including at least first and second sections that form portions of the housing;
fasteners for fastening the sections of the housing together; and
wherein when the fasteners are unsecured there is formed at least two break lines between respective sections and wherein the two break lines are oriented such that the outer mold is permitted to expand outwardly around substantially the entirety of the outer mold.

14. The molding device of claim 13 wherein the housing includes a top, bottom and a pair of sides, and wherein the break lines are formed opposite each other.

15. The molding device of claim 13 wherein the housing includes a series of corner areas and wherein the two break lines are formed in two opposed corner areas.

16. The molding device of claim 13 wherein the multisectional housing includes a pair of L-shaped sections; and wherein when the L-sections are secured together the two break lines lie in opposed corner areas of the housing.

* * * * *